July 25, 1944.  E. E. EICKMEYER ET AL  2,354,249
GASOLINE DISPENSING APPARATUS
Original Filed March 22, 1938   10 Sheets-Sheet 1

(THIS SPACE OPTIONAL
FOR ADVERTISING
OR THE LIKE)

INITIAL – 0 0 –
FINAL    0 5 ½
(IDENTIFICATION OF
SERVICE STATION)

Inventors
EARL E. EICKMEYER
ANTHONY G. HORVATH

Attorneys

July 25, 1944.    E. E. EICKMEYER ET AL    2,354,249
GASOLINE DISPENSING APPARATUS
Original Filed March 22, 1938    10 Sheets-Sheet 2

Inventors
EARL E. EICKMEYER
ANTHONY G. HORVATH
By
Attorneys

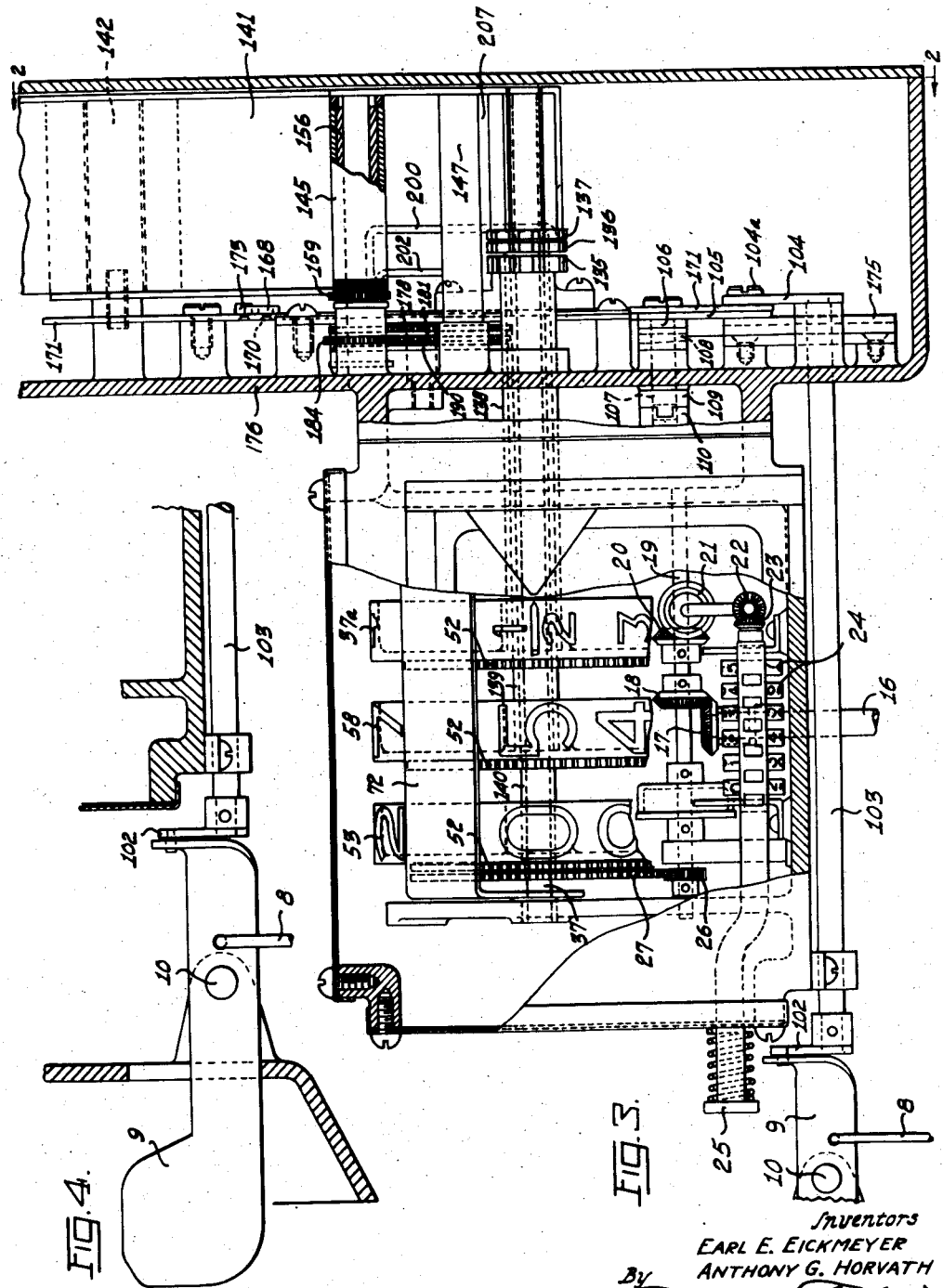

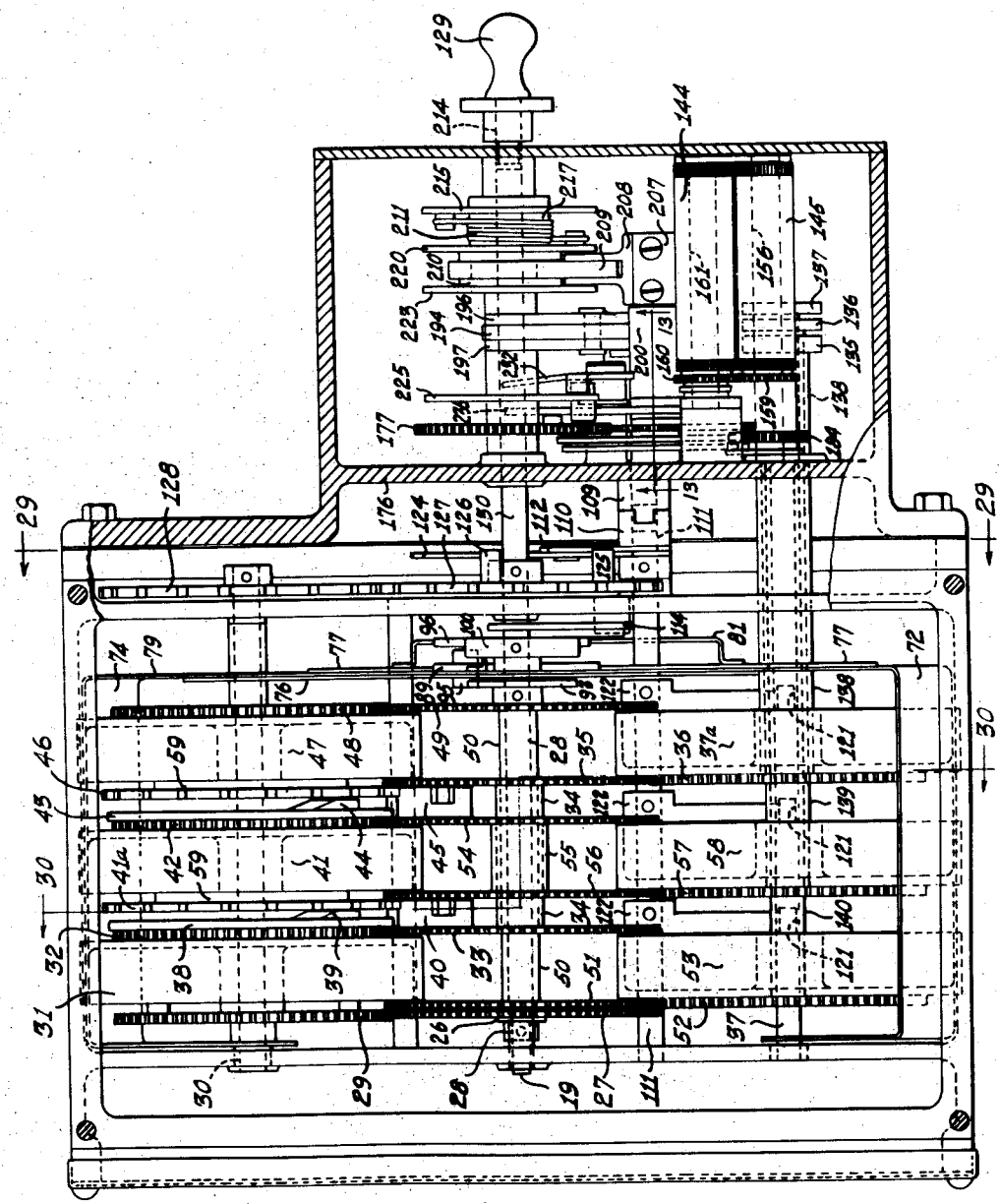

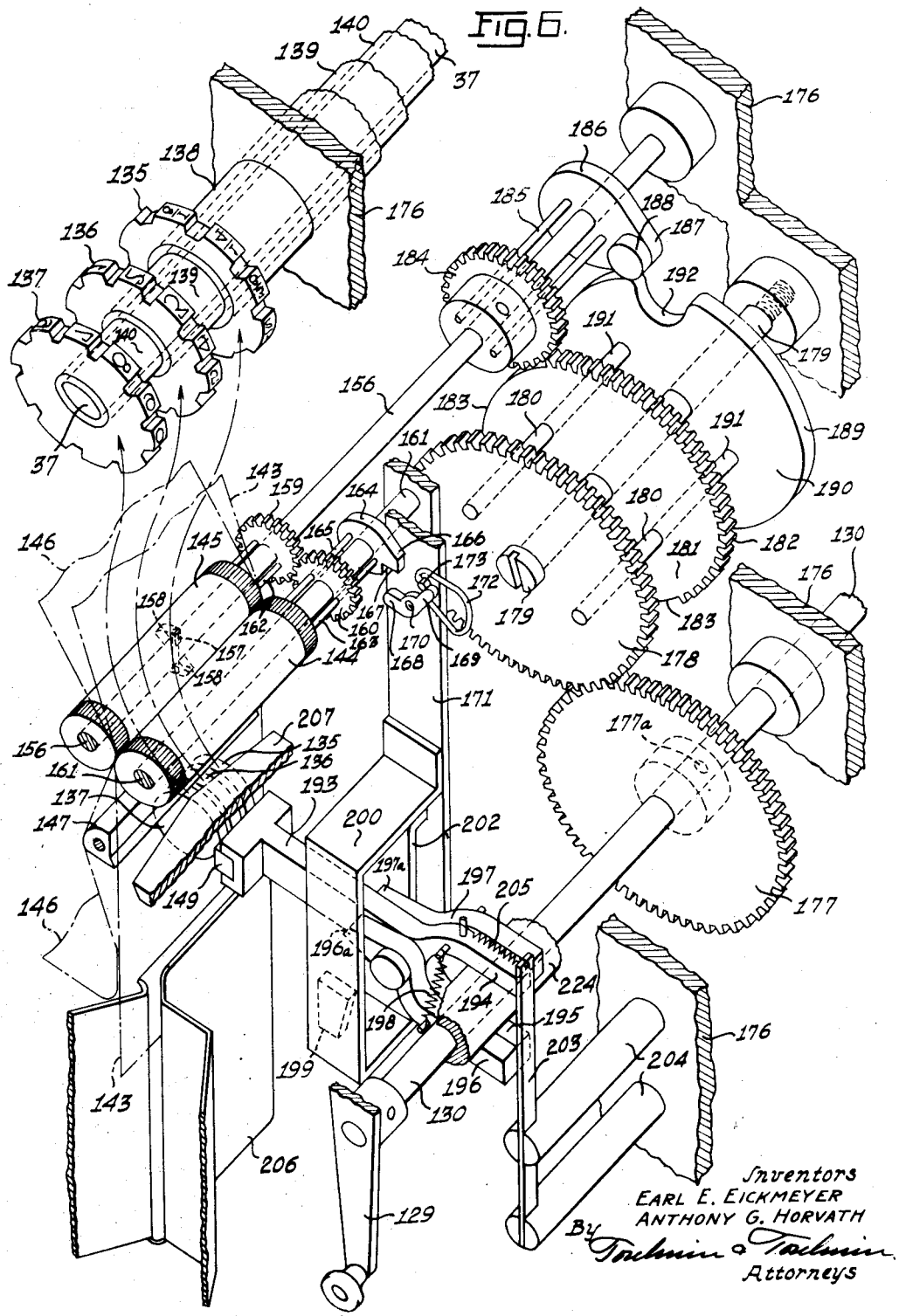

July 25, 1944.  E. E. EICKMEYER ET AL  2,354,249
GASOLINE DISPENSING APPARATUS
Original Filed March 22, 1938   10 Sheets-Sheet 6
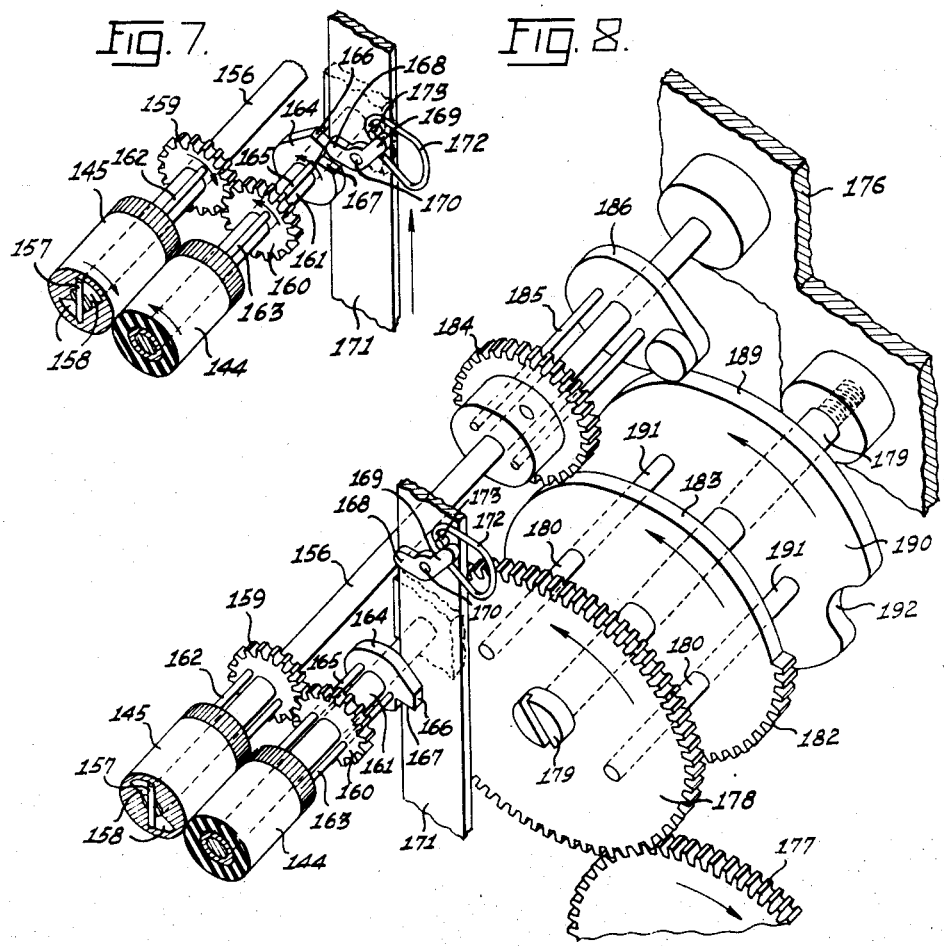

July 25, 1944.  E. E. EICKMEYER ET AL  2,354,249
GASOLINE DISPENSING APPARATUS
Original Filed March 22, 1938    10 Sheets-Sheet 7
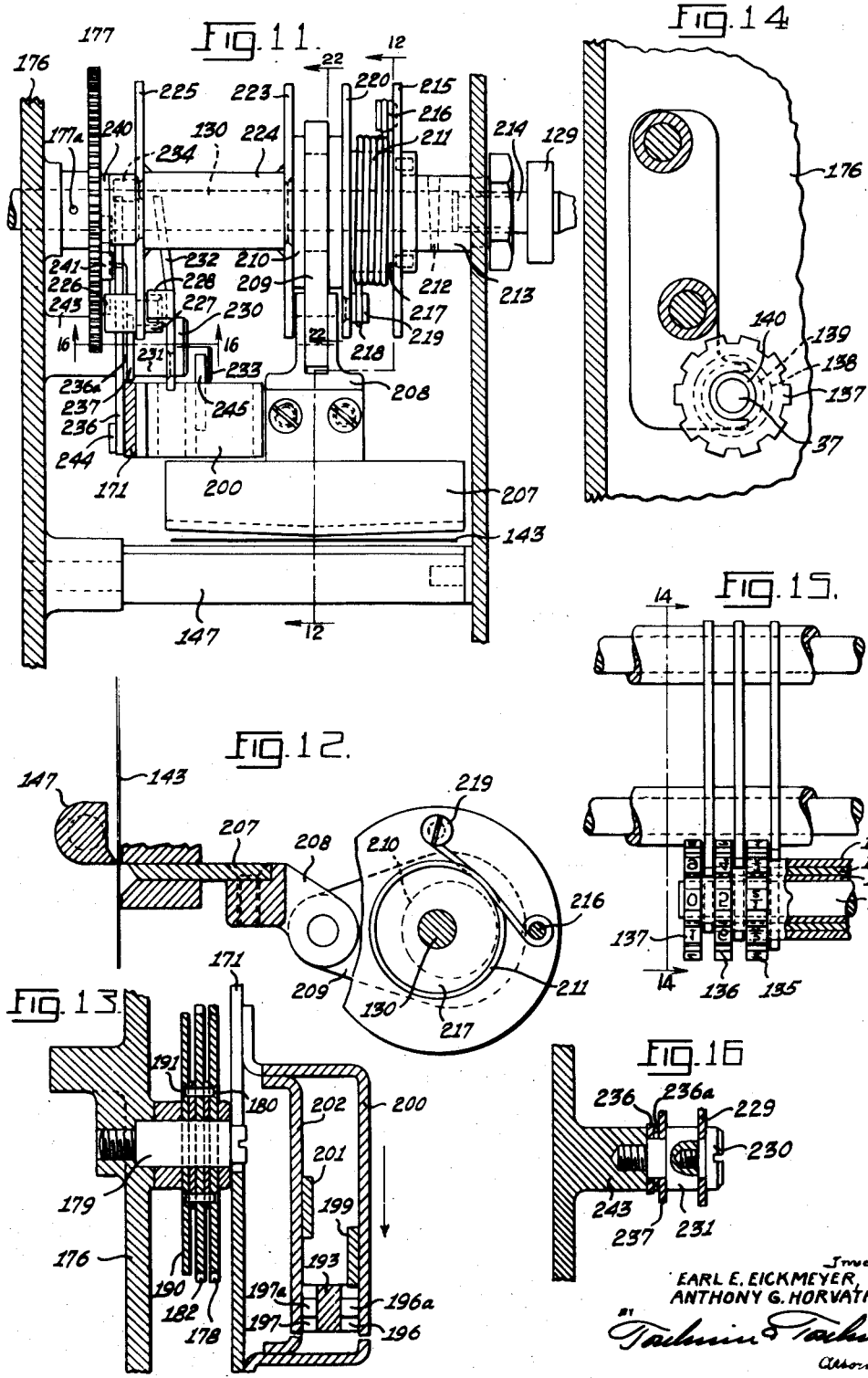
Inventors
EARL E. EICKMEYER,
ANTHONY G. HORVATH,

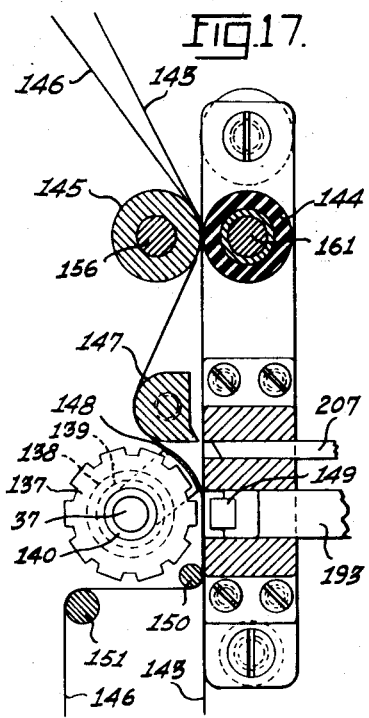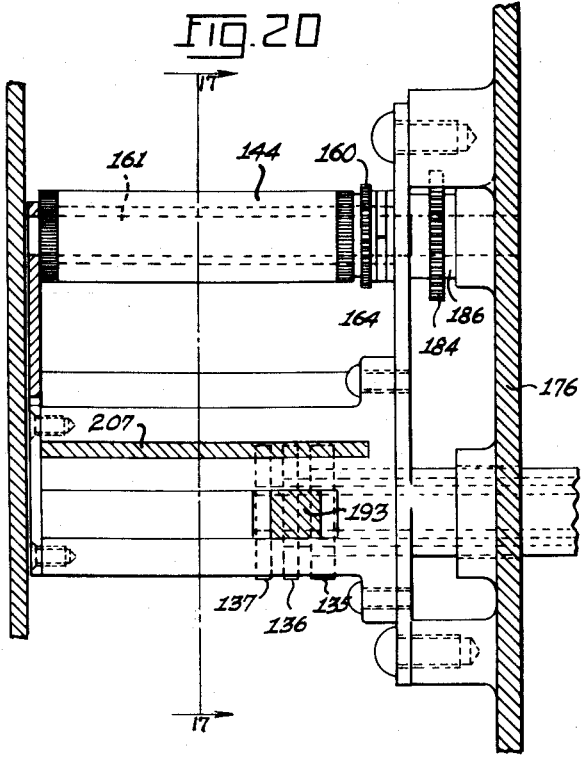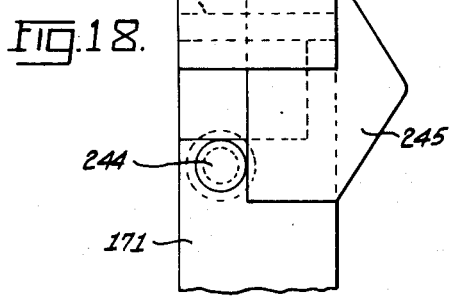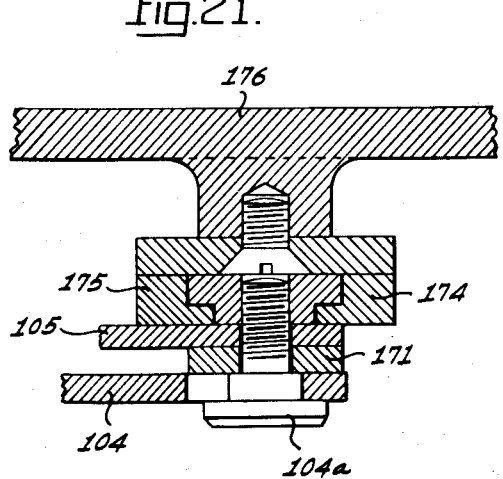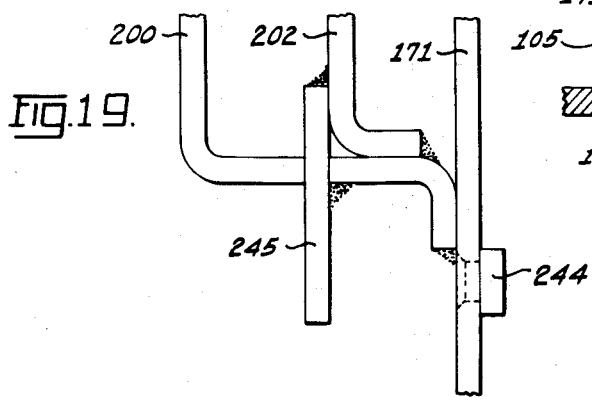

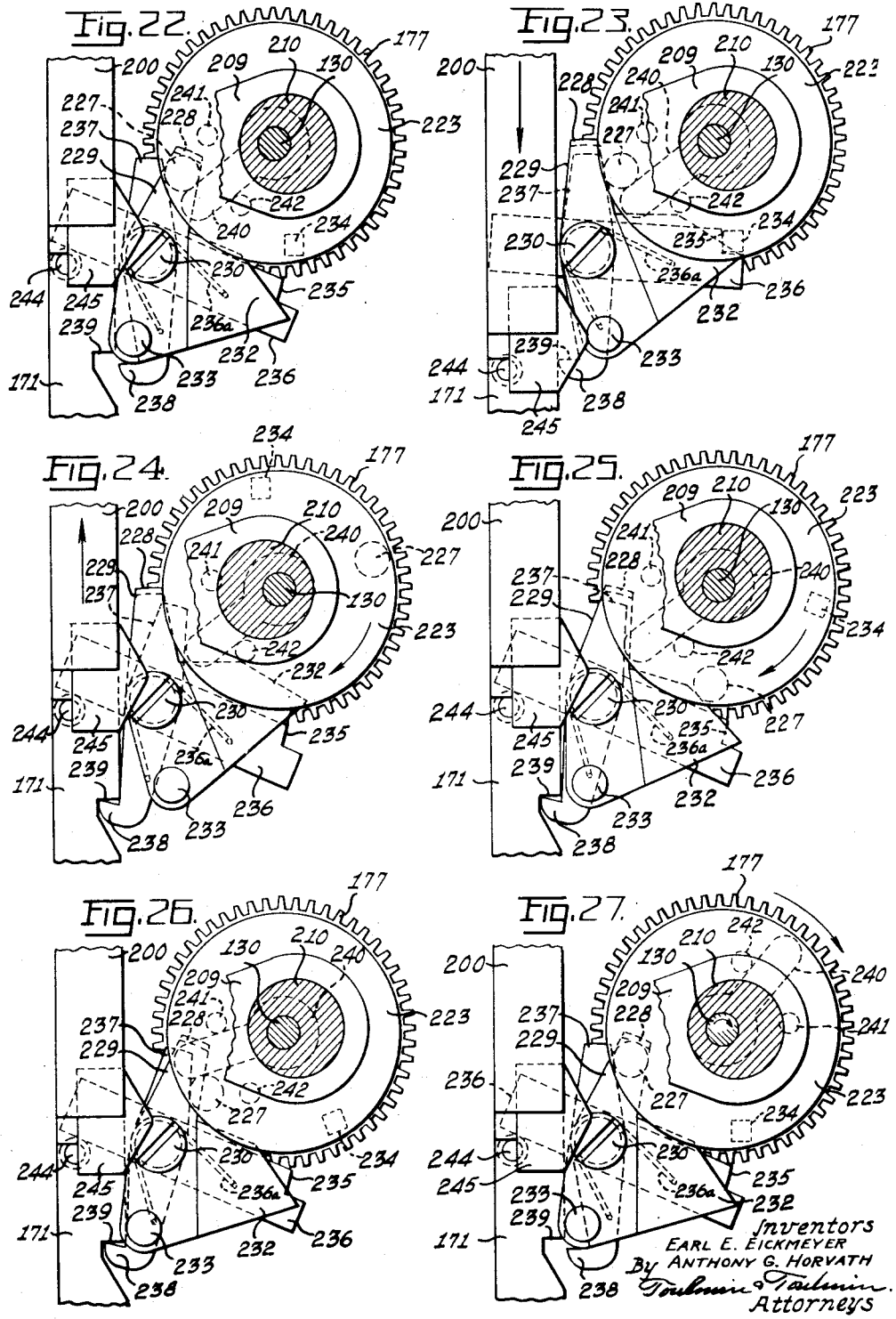

July 25, 1944.  E. E. EICKMEYER ET AL  2,354,249
GASOLINE DISPENSING APPARATUS
Original Filed March 22, 1938   10 Sheets-Sheet 10
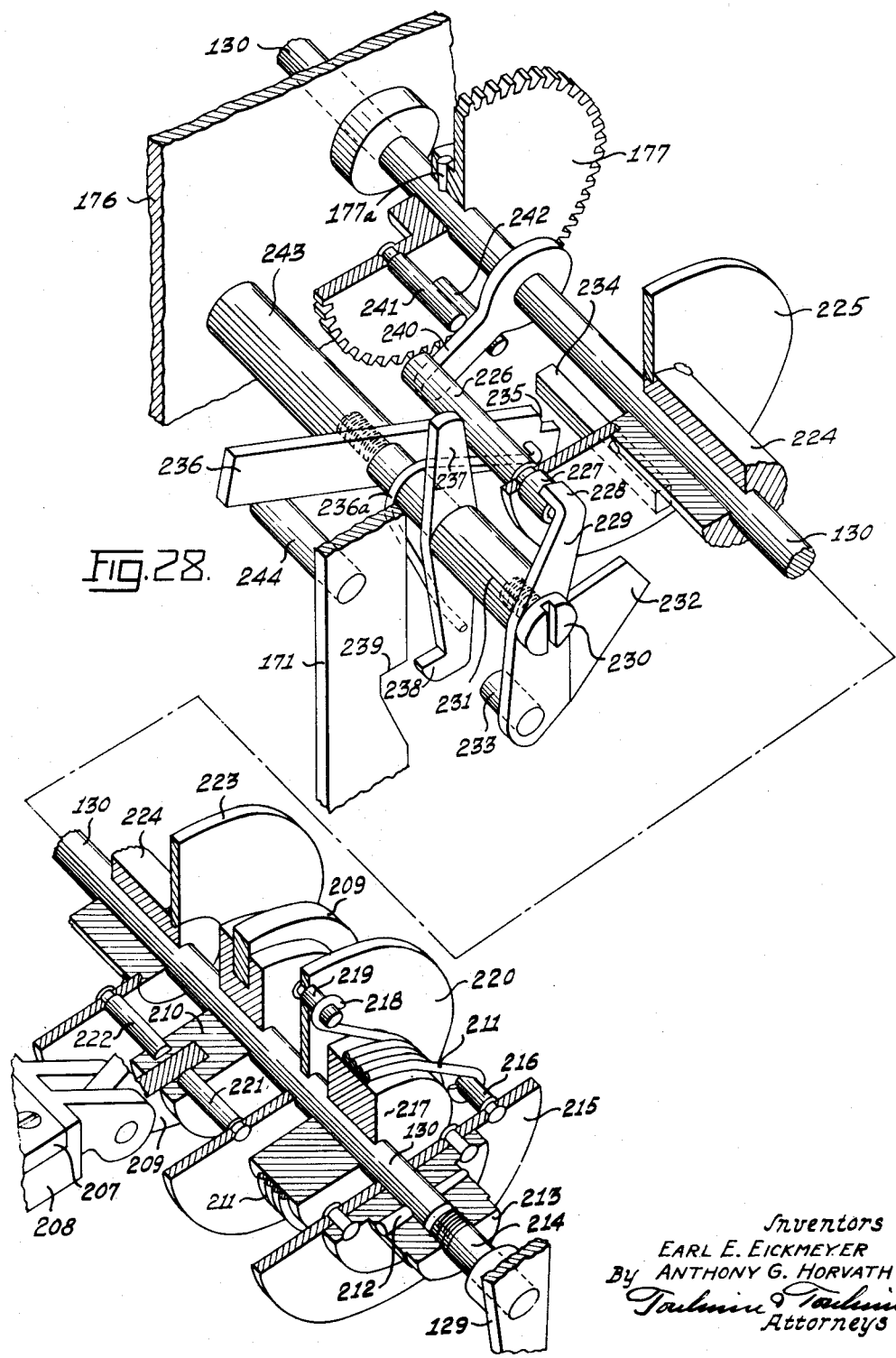
Inventors
EARL E. EICKMEYER
By ANTHONY G. HORVATH
Attorneys Patented July 25, 1944

2,354,249

UNITED STATES PATENT OFFICE 2,354,249

GASOLINE DISPENSING APPARATUS

Earl E. Eickmeyer and Anthony G. Horvath, Dayton, Ohio, assignors to The Dayton Pump and Manufacturing Company, Dayton, Ohio, a corporation of Ohio Original application March 22, 1938, Serial No. 197,524. Divided and this application March 26, 1942, Serial No. 436,266

3 Claims. (Cl. 222—39)

This invention relates to gasoline dispensing pumps, and is a division of my copending application Serial No. 197,524, filed March 22, 1938.

It is the object of our invention to provide a gasoline dispensing pump in which a visual indicator, a recorder and printer are operated by a meter through which the gasoline passes as it is being dispensed.

It is a further object to provide for such an arrangement of the printer that the ticket is printed and delivered upon the placing of the hose nozzle upon its supporting hook prior to the return to zero of the visual indicator so that the customer can compare the printed amount on his ticket with the maximum indication on the visual indicator.

It is a further object to provide for an interlocked manually operable means for returning the visual indicator to zero, together with the printer wheels, after the ticket has been printed and issued subsequent to the hanging of the nozzle on the hook.

It is an object of the invention to provide a support or hook for the hose nozzle which is so arranged that when the nozzle is removed and this hook is moved upwardly, the condition of the visual indicator and its associated printer wheels will be indicated by the taking of an impression of such registration on the ticket to be issued; and upon the completion of the dispensing operation and the downward movement of said hook, then the final printing will take place of the number of gallons visually indicated as having been dispensed.

It is a further object to provide means of severing the printed ticket.

It is an object to provide means of printing on the ticket various advertising matter, station identifications and the like.

It is a further object of this invention to provide means associated with said hook for connecting a motor to an electric circuit to operate a pump which supplies the gasoline to the meter.

It is an object of this invention to provide the printer wheels on the same shafts as the indicator wheels so that they will turn together to insure that the visual indication and the printing registration are identical.

Referring to the drawings:

Figure 3 is a front elevation with the cover partially broken away from the indicator and the parts of the indicator wheels broken away to show the totalizer mechanism. This view also shows in front elevation, partially in section, the printer mechanism and its relationship to the visual indicator.

Figure 4 is a detailed enlarged view of the hose supporting hook and its connections to the motor switch and the printer mechanism.

Figure 5 is a top plan view, partially in section, showing the visual indicator and printer mechanism.

Figure 6 is an exploded, isometric view with the type wheels moved to one side and shown in detail, illustrating the feeding, printing and shearing mechanism of the printer.

Figure 7 is an isometric view, partially in section, showing the arrangement of the feed wheels for feeding the paper strip. These rollers or wheels are in the position they occupy between the initial and final printing operations.

Figure 8 is an isometric view of the paper feeding rollers and associated gearing and a portion of the vertically moving actuator bar. The parts are in the position where the reset handle has returned the feed rollers to their initial feeding position, but the gearing still has some distance to move in order to return to the initial position. This gearing returns to its initial position and, when it does so, it is in the position shown in Figure 6, just prior to a new cycle of dispensing gasoline.

Figure 9 is a side elevation, in detail, of the vertically moving shifter rod, on which are cams for actuating the halves of a fork, that serve to control the printing mechanism. This figure shows the parts as the bar is moving downwardly when the hook has been taken off the handle at the initial stages of dispensing gasoline so as to bring about the initial printing operation which consists of pressing the carrier, having the platen on one end, against the paper and carbon sheet to take an impression from the type wheels. Figure 9 shows the forked end of this carrier for the platen.

Figure 10 is a similar view showing the cam and bar in a lower position, with one of the pivoted fingers on the fork elevated.

Figure 11 is a top plan view of the detail assembly of the chopper mechanism with the sheet in section and with the supporting walls of the frame in section.

Figure 12 is a section on the line 12—12 of Figure 11, looking in the direction of the arrows.

Figure 13 is a section on the line 13—13 of Figure 5.

Figure 14 is a section on the line 14—14 of Figure 15.

Figure 15 is an elevation looking at Figure 14 from the righthand side to show how the type wheels are supported.

Figure 16 is a section on the line 16—16, looking in the direction of the arrows in Figure 11.

Figure 17 is a section on the line 17—17 of Figure 20, showing the position of the paper strip, the carbon sheet, the feed rolls, the type impression wheels, the platen and the chopping mechanism.

Figure 18 is a detail enlarged view of the cam chopper spring release.

Figure 19 is a detail view of Figure 18, looking in the direction of Figure 18 from the righthand side thereof.

Figure 2:
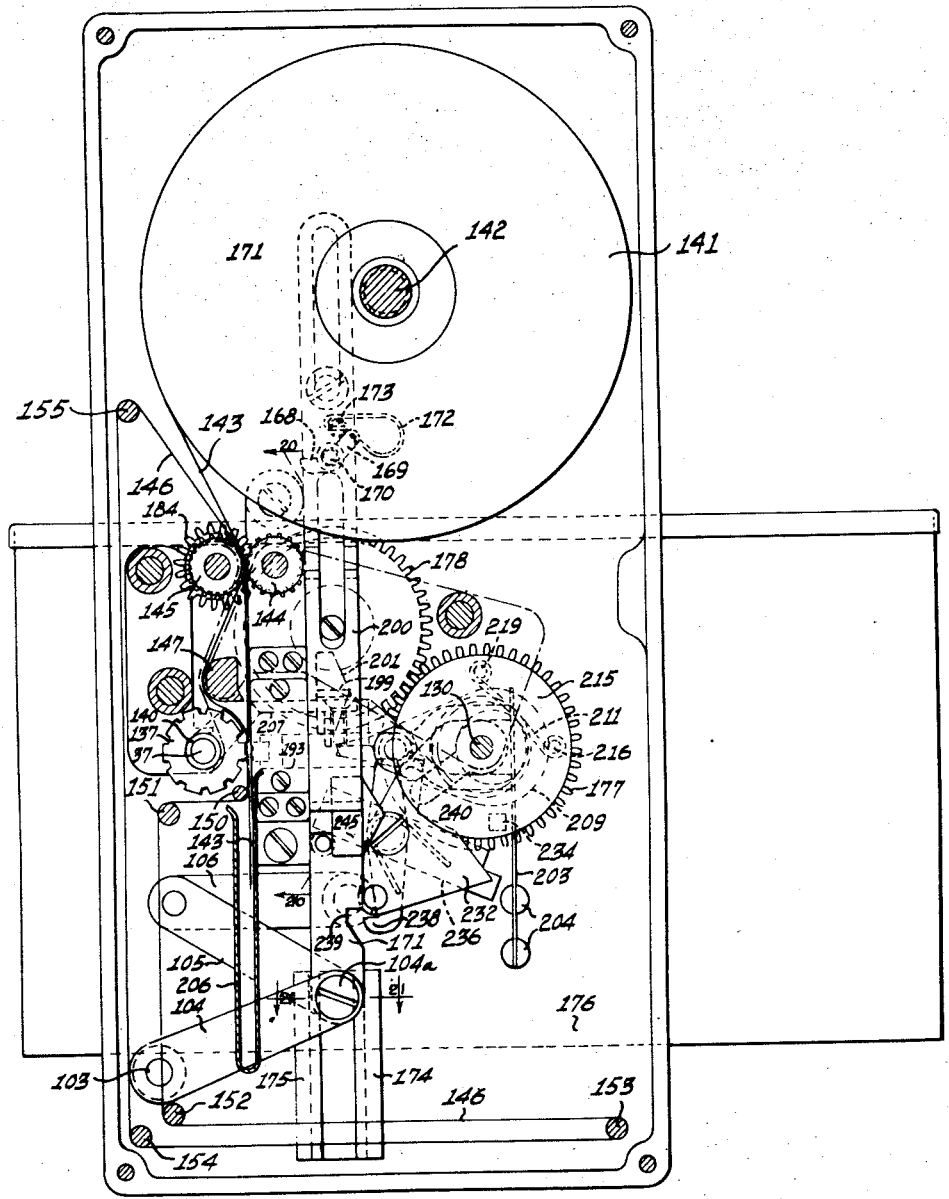
Figure 2 is a side elevation of the printing and indicating mechanism boxes with the cover removed to display the interior of the printer mechanism box. This view is taken on the line 2—2 of Figure 3.

Figure 20 is a section on the line 20—20 of Figure 2, looking in the direction of the arrows, showing the relative position of the paper feed rolls, printer wheels, chopper and associated mechanism.

Figure 21 is a section on the line 21—21 of Figure 2, which shows a sliding support for the pivot of the linkage system actuated by the hose hook for actuating the vertically reciprocable bar and associated mechanism.

Figure 22 is a section on the line 22—22 of Figure 11, looking in the direction of the arrows, showing in detail the position of the control mechanism for the ticket chopper. The parts in Figure 22 are in the position of rest of the machine prior to its initial operation.

Figure 23 is a similar view to Figure 22, showing the parts in the position when the vertical bar moves down and the chopper controlling cam has forced the locking pawl out of locking position so far as the spring is concerned, but this also locks the spring again through placing another type of locking pawl into engagement with a square peg.

Figure 24 is a similar view showing the parts in position with the spring released, the cut-off mechanism in motion and the cut-off eccentric at the extreme of its throw. The vertical bar is also locked against return movement to insure that the cut-off operation will be completed without a downward movement of the bar. This prevents a further unwinding of the spring before it can be re-wound. The parts in this position are in cutting position and the ticket is now being cut off. This is indicated by the eccentric being at its maximum toward the left.

Figure 25 is a similar view showing the parts in position so that the locking pawl is being moved into locking position which it initially had, as in Figure 22. This first locking pawl locks the spring that does the cutting against movement.

Figure 26 is a similar view showing the parts in position, where the bar is about to be unlocked. In this figure, the parts are at rest after the chopping movement and before the start of the re-winding of the spring movement.

Figure 27 is a similar view showing the parts in such a position where the bar is unlocked and the resetting operation is taking place, which results in re-winding the spring and storing energy in it for another cutting operation.

Figure 28 is an exploded isometric view showing the chopper mechanism partially in section. The parts are pictured in the "at rest" position, prior to any actuation.

Figures 1, 29:
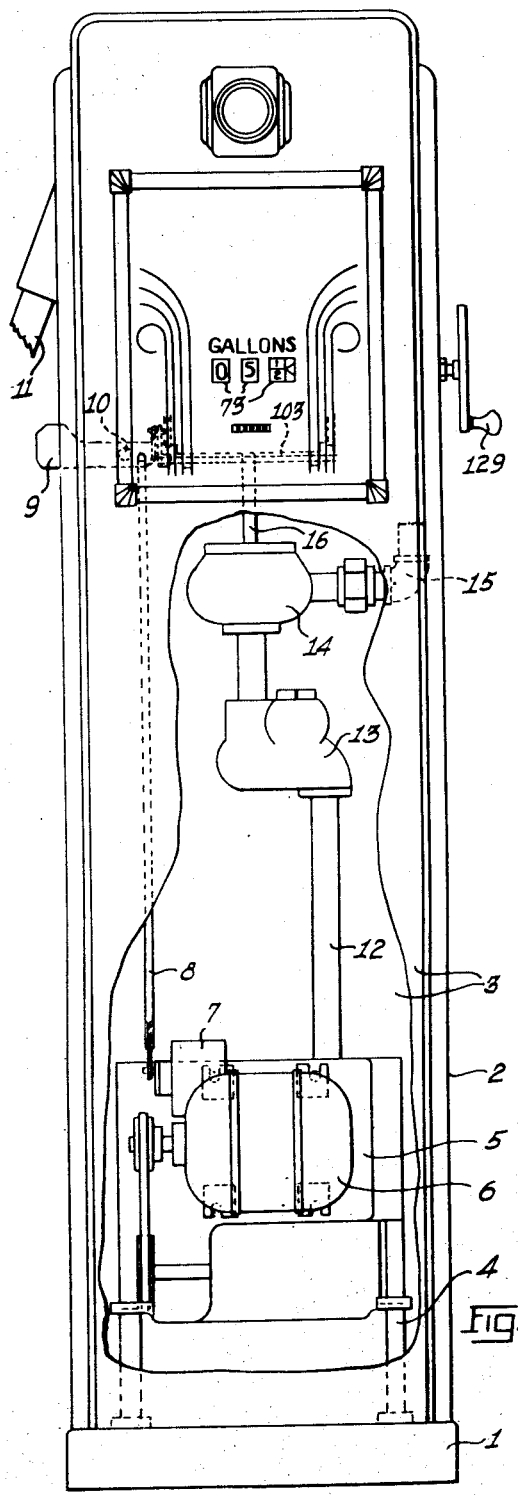
Figure 1 is a front elevation of a pump embodying this invention with the front wall thereof broken away to show the motor, pump and meter.

Figure 29 is a view of a typical ticket after printing.

Referring to the drawings in detail, 1 is a base of a gasoline dispensing cabinet having side walls 2 and front and rear walls 3. Mounted upon this base upon legs 4 is a pump 5 and a motor 6. The motor is provided with a switch 7 that is opened and closed by a rod 8 that is connected to a hose handle 9 pivoted at 10. This hose handle is adapted to support the free end of the dispensing hose that is shown at 11.

The gasoline pumped by the pump 5 passes upwardly through the pipe 12 through the trap 13, meter 14, pipe 15 and thence to the hose 11. The meter 14 is provided with a driven shaft 16 which performs the multiple function of actuating the visual indicator, the printing wheels and paper feeding mechanism. It also actuates a total gallon counter that is associated with the visual indicator and actuates the shield that is intermittently interposed over the face of the indicator wheels.

*Visual indicator mechanism*

The drive shaft 16 actuates the bevel gear 17 which meshes with the bevel pinion 18 on the shaft 19. This, in turn, actuates the bevel gears 20 and 21 and the gears 22 and 23 which turn the counter wheels 24. These counter wheels are reset by the reset device 25, the exact nature of which forms no part of this invention.

The shaft 19 carries a pinion 26 which meshes with the indicator gear 27 mounted upon the shaft 28. This gear meshes with gear 29 on the shaft 30 rotating on that shaft and also rotating the indicator wheel 31 which is connected to the gear 29. The indicator wheel 31 has on its opposite face a gear 32 also freely mounted on the shaft 30. Gear 32 then drives gear 33 which is mounted upon a sleeve 34 on the shaft 28. The other end of this sleeve 34 is connected to the gear 35 which drives the gear 36 freely mounted on the shaft 37. The gear 36 is connected to the indicator drum 37a so that drums 31 and 37a turn together.

Returning to gear 32, there is mounted on one face thereof a disk 38 which has a pair of transfer teeth marked 39 that intermittently engage, once each revolution of drum 31, with the pinion 40 to move that pinion sufficiently to cause the next drum 41, through gear 41a, to move one-tenth of a revolution. The drum 41, in turn, has a gear 42, a plate 43 and transfer teeth 44 engaging with the pinion 45 which, in turn, meshes with gear 46 that rotates the drum 47 one-tenth of a revolution.

Drum 47 has a gear 48 which meshes with the gear 49 on the sleeve 50. This sleeve carries a gear 51 which engages with a gear 52 on the drum 53, so that drums 53 and 47 travel together. Likewise, the gear 42 of drum 41 meshes with the gear 54 on the sleeve 55 which carries a gear 56 that engages with the gear 57 of the intermediate drum 58 to actuate that drum so that drums 41 and 58 travel together.

In order to explain the connection between the gear 41a and the drum 41, refer to views in Figures 51 to 54 inclusive. The drum 41 is free upon the shaft 30. Likewise, the gear 41a is free upon the shaft 30. When the meter is driving the gearing to rotate the indicator wheels such as 41, the gear 41a is moving. It carries the ratchet 59 whose teeth 60 are inclined in one direction. These teeth are engaged in one direction by a pin 61 mounted upon a swinging lever 62 that is pivoted at 63 on the boss 64 on the inside of the drum 41. The movement of the gear, therefore, causes the drum, through this ratchet and pinion construction, to move with it. This is during the movement of the drum for indication purposes.

The lever 62 has connected at its free end at 65 a helical spring 66, the other end of which is connected to a boss 67 on the drum 41. The boss 64 has pivoted on it a pawl 68 that is spring-pressed by the spring 69 with its shoulder 70 into engagement with a notch 71 in the shaft 30. This comes into play only when the mechanism is being reset to zero by manual operation, hereinafter disclosed, so that the pawl 68 then engages with the notch 71 and the shaft 30. As the reset mechanism operates the shaft 30, this serves to carry the drum 41 in the direction to return it to zero for a new indication. In this manner, the wheels are cleared of their indication and are brought back to zero registration through the reset mechanism. The spring 69 is mounted upon a boss 69a on the inside of the drum 41.

Printing mechanism

The printer wheels 135, 136 and 137 respectively indicate, reading from right to left, fractions, units and tens, as will be more fully seen in Figure 6. Type wheel 135 is mounted upon the sleeve 138 which is connected to the drum 37a. The type wheel 136 is mounted on the sleeve 139 and is connected to the drum 58. The type wheel 137 is mounted on the sleeve 140 which, in turn, is connected to the drum 53. Therefore, these type wheels rotate with these drums so that the setting or actuation of these drums will correspondingly set or actuate these type wheels.

The paper strip is wound into a roll 141 and is mounted upon the axle 142. The strip itself is designated 143 and is fed between the two feeding rollers 144 and 145. The roller 144 is a resilient roller and the roller 145 is a hard roller. The roller 145 carries advertising or identifying data to be printed on the strip. As hereinafter described, this particular printing operation (other than the numerical) takes place when the return-to-zero mechanism feeds the paper strip preparatory to a new cycle of operations so that these designations are printed prior to the initial printing operation of the status of the visual indicator at the beginning of the dispensing operation.

There is also fed between the rollers 144 and 145, in engagement with the paper strip, a carbon strip or carbon ribbon 146. This is a continuous ribbon that passes over a guide 147, and thence over the type wheels. It is guided over the type wheels by the guide 148. It passes between the face of the type wheels and the paper strip 143. On the other side of this paper strip is the platen 149 that forces the paper and carbon strip against the type wheels. The carbon strip then passes around the guide 150, guide 151, guide 152, guide 153, guide 154, and guide 155, back to the feed rolls.

Returning to the roller 145, it will be observed that it is mounted upon the shaft 156 that is mounted in the respective walls of the enclosing cabinet for the printer. The connection between this shaft and the roller 145 consists of a cross pin 157 which is adapted to work within the slots 158 on the inside of the roller 145. The purpose of this loose connection is to permit of the advancing of the roller 145 a limited distance before the shaft 156 turns.

The shaft 156 carries a pinion gear 159 which meshes with a gear 160. These gears 159 and 160 turn freely on the respective shafts 156 and 161. Gear 159 is connected by the rivet or rod connection 162 to the roller 145 to turn with it. The gear 160 is connected by a rod or rivet 163 to the roller 144 and to the cam lock 164 by the rod or rivet 165.

This cam lock consists of a cam body having a nose 166 and a cut-away portion 167. The nose engages with a bell crank pawl having one end designated 168. This pawl is pivoted at 170 upon the vertical reciprocable bar slide 171. This pawl 169 is forced in one direction by the spring 172 mounted at 173 upon the bar 171. The successive positions of this pawl are shown in Figures 6, 7 and 8.

The actuation of these rollers 144 and 145 is effected in the first place by the bar 171 through the engagement with the cam disk 164 of the pawl 168 with the cam nose 166. This takes place when the bar moves upwardly upon the return of the hose to the hook and the downward movement of the hook. The hook 9 is connected to this bar 171 through the lever 102, shaft 103, and link 104.

The pivot pin 104a connects the link 104 to the bottom of the bar 171. This pin also is a guide which projects between the spaced guide members 174 and 175. This is shown in elevation in Figure 2 and in a detail section in Figure 21. These guide members 174 and 175 are carried upon the enclosing housing for the printer, generally designated 176. The purpose of this movement of the bar, so far as the feeding of the paper is concerned, is to move the paper to its final printing position from the initial printing position so that it can receive its final impression from the type wheels 135, 136 and 137 to indicate the same amount that appears upon the visual indicator at the end of the dispensing operation. Thereafter the chopping or severing operation takes place for severing the ticket so printed. This will be hereinafter explained.

After the severing operation takes place, there is a further movement of the paper through these rollers 144 and 145 in order to place it in position for the initial printing operation at the beginning of a new cycle of operations. This positioning of the paper at this time is a part of the resetting operation and a part of, and subsequent to, the cut-off operation. Therefore, it is necessary to describe the operation of this mechanism by now referring to the zero resetting mechanism which performs the several functions of bringing the type wheels 135, 136 and 137 and the several indicator drums 31, 41, 47, 53, 58 and 37a to their zero positions, and which also serves to cause the paper strip to be fed to its new position after a portion of it had been cut, upon which the previous printing operations have been performed.

The zero resetting mechanism is actuated by the handle 129 which is mounted upon the shaft 130. The shaft 130 carries the gear 177 which is pinned to the shaft. Shaft 130 is known as the reset shaft. This gear meshes with another gear 178 which is carried on the shaft 179 loosely. In practice this is simply a screw bolt forming a short axle. Gear 178, loosely mounted on 179, is connected by rivets or pins 180 to a companion fragmentary gear 181 that is also loosely mounted on 179. This gear is provided with teeth 182, a portion of which are cut away at 183. It meshes with the pinion gear 184 that is pinned to the shaft 156. It is connected by rivets or pins 185 to the cam follower disk 186 having a nose 187 carrying a cam follower roller 188. This roller follows the periphery 189 of the cam disk 190 loosely mounted on the shaft 179 and connected by pins 191 to the gear 181. This cam 190 is provided with a low point 192 which receives the roller 188 and the nose 187 of the disk 186.

When the handle 129 is rotated, it rotates the shaft 130, the gear 177, the gear 178, the fragmentary gear 181, the pinion 184, the shaft 156, the roller 145, the gears 159 and 160 and the roller 144. It also rotates the disk 186 and the cam disk 190. The result of these movements is to advance the paper to a position for its initial printing operation for the next succeeding cycle of printing which will be initiated by the upward movement of the hose hook 9 when the new dispensing operation is started. The function of 192 is merely to accommodate the roller 188 and its nose 187 due to the revolution of several parts.

It will be observed that, after the gear 184 has been given a complete revolution by the fragmentary gear teeth 182, the shaft 130 continues to revolve and, during that period, the cut-away portion 183 of the disk 181 clears the teeth of 184 so that it is not rotated, and at the same time, the roller 188 can roll freely upon the surface 189 of the cam 190. This, therefore, permits the continued operation of the handle 129 and shaft 130 for other purposes after having performed the primary feeding function of the initial feeding of the paper by the rollers 144 and 145.

We now come to the imprinting of the final impression upon the paper of the ultimate amount of liquid dispensed, as shown by the type wheels. This printing operation takes place by reason of the movement of the platen 149.

This platen is carried upon a carrier bar 193. The bar is provided with a yoke at its right-hand end having a pair of spaced arms 194 and 195 to form the yoke. There is pivoted on either side of this yoke, pivoted yoke fingers 196 and 197. The finger 196 is drawn upwardly by the spring 198 that is connected to it at one end and to the stationary yoke arm 194 at the other. A similar spring 198a holds the pivotal yoke finger 197 downwardly.

These yoke fingers are operated by cam 199 carried on the loop 200 of the bar 171 and by the cam 201 carried on the face of a second loop 202 which is also carried by the bar 171. One of these cams, such as cam 199, engages with the nose 196a when the bar 171 is moving downwardly. The purpose of this is to flex the plate spring 203 which is supported at 204 so as to store energy in that spring and the helical spring 205 to push the carrier 193 with its platen 149 against the paper carbon strip and type wheels.

When the cam 199 passes by the nose 196a, the carrier 193 is released and this snap action brings about the printing operation which is the initial printing operation. It will be recalled that the bar 171 is moved for this purpose by the upward movement of a hook 9 after removing the hose at the starting of the dispensing operation.

The final printing operation takes place when the bar 171 moves upwardly when the hose hook 9 is pulled downwardly at the conclusion of a dispensing operation. In this instance, the cam 201 operates in the same manner upon the pivoted finger 197 for storing energy in the springs 203 and 205 which, when released by the movement of the nose 197a from the cam 201, results in another printing operation which is the final printing operation. Thus, both printing operations are performed through the reciprocation of the bar 171, which reciprocation takes place as the result of actuation of the hose hook 9.

When one finger is operative, the other can slide over its cam. This is shown by Figures 9 and 10, which illustrate such an action when the bar 171 is moving downwardly.

*Chopper*

The ticket, as it descends, is fed into a guide 206. It drops into this guide when it is severed. This severing operation is performed by a knife 207 which is drawn back with its carrier 208 by a connecting link 209 connected to an eccentric disk 210 mounted on the shaft 130. As hereinafter described, energy is stored in the spring which, when released, causes the carrier 208 to carry the knife 207 forwardly to shear the paper strip to form the ticket.

It will be recalled that the shaft 130 is a reset shaft turned by the handle 129. The winding of the spring 211 is effected by the reset shaft 130 when it is turned back by the handle 129 to zero resetting position. The release of this spring tension to cause the chopping operation is by the bar 171 when it makes its upward movement as a result of hanging the hose on the hook 9.

With particular reference to the storage of the energy in spring 211, the shaft 130 is connected by a pin 212 to a hub 213 which carries at one end the stub shaft 214, upon which the handle 129 is directly mounted. It is also pinned to a disk 215 that, in turn, is connected by the stud 216 to the spring 211. This spring is wound on a drum 217 mounted on the shaft 130. This is a loose mounting. The other end of the spring 211 is connected at 218 to a stud 219 on a disk 220. This disk is also loosely mounted upon the shaft 130. This disk, in turn, is connected by a pin 221 to the eccentric 210. This eccentric is loosely mounted on the shaft 130.

The eccentric 210 is connected by the pin 222 to a disk 223 mounted on a hub 224 that is loosely mounted on the shaft 130. The other end of this hub 224 carries a disk 225 which is provided with a cross pin 226 having a projecting end 227 so that it projects completely through the disk 225 and on either side thereof. The end 227 of this pin engages with the nose 228 of a pawl 229 which is mounted pivotally by the screw 230 upon the stud 231. This pawl is provided with a locking nose 232 and with a pin 233.

Returning to the disk 225: it is provided with a square pin 234 adapted to engage it with a shoulder 235 in a pivoted lever 236 carried on the stud 231. This stud carries a transverse locking finger 237 having a locking nose 238 that is adapted to engage with the notch 239 in the bar 171. Returning to the shaft 130: there is mounted on that shaft, loosely, a finger 240. This finger is adapted to engage the two pins 241 and 242 mounted in the face of the gear 177. This gear is pinned by the pin 177a to the shaft 130.

The wall 176 supports the shaft 130 and also the boss 243 that acts as a support for the screw-threaded shoulder stud 231. The reciprocating bar 171 carries a pin 244 which serves to engage with the lever 236 to disconnect it at its other end from the square pin 234 when the bar 171 is moving upwardly. This is the means of releasing the mechanism so that the spring 211 can unwind and cause the lefthand movement of the carrier 208 to press the chopper blade 207 against the paper strip to sever a ticket.

The lever 236 is urged into engagement, normally, before it is unlocked, with the bar 234 by the spring 236a which is mounted upon the stud 231 and is connected at one end to the lever 236, and at its other end to the locking pawl 237. It performs the further function of causing the nose 238 to engage with the pawl 239 in the bar 171 to maintain it against downward movement. The purpose of this is to prevent an undesired amount of unwinding of the spring 211 and to limit the unwinding to that sufficient to bring about a chopping operation so that it will not become completely unwound and so that it will be held against complete unwinding until it can be re-wound.

The several positions of this mechanism during these several operations just described are shown in Figures 22 to 27. Figure 22 shows the parts at rest, at the beginning of a dispensing operation. Figure 23 shows the parts getting ready to be moved to unlocking position to permit the spring to unwind. In this position, the bar 171 is going down so that the cam 245 will engage with the pin 233 to move the pawl 229 and its nose 228 out of the path of the pin 227.

It will be noted that, in Figures 22 and 23, the nose 238 is out of engagement with the shoulder 239 so that this downward movement of the bar 171 can take place. This nose is held out by the pin 226.

Turning to the next view, Figure 24, when the bar 171 has moved upwardly, then the parts are shown with the bar 171 locked against downward movement by the nose 238 being in the notch 239. The parts are shown, in Figure 24, in the extreme cutting position.

In Figure 25, the parts are shown with the pawl 232 being engaged with the pin 227 to restore 228 and 229 to their position shown in Figure 28.

Figure 26 shows the parts at rest after the chopping operation and ready for the resetting operation.

Figure 27 shows them in re-winding position.

*Sequence of operations*

The following is a summary of the sequence of operations:

The pump is assumed to be at rest with the hook carrying the hose handle; the motor is stationary and the current is cut off. The mechanism has been returned to zero. The visual indicator and the type wheels indicate zero.

The operator lifts the hose nozzle off the hook 9 and pushes up the hook. He thereby closes the switch 7 by actuating the rod 8. The pump 5 starts to deliver gas through the pipe 12 and meter 14. The gas will flow through the meter 14 if the hose nozzle is open. This will rotate the shaft 16, turning the indicator wheels and the printer wheels.

The action of the operator in lifting the hook 9 results in printing the zero designation upon the strip, which designation is also the condition of the visual indicator. The strip has already received printing from the hard roller 145 of the advertising and other identifying data. This was accomplished when the return-to-zero mechanism actuated by the handle 129 fed the paper strip ready for the initial printing operation, at which time the chopper spring 211 was also wound.

The dispensing operation continues for the amount of gas desired. The operator then hangs the nozzle on the hook 9, pulling the hook down. This causes the bar 171 to go up and results in three things happening. The paper strip is fed one step so as to receive the final printing operation, which final printing operation is caused by the downward movement of the hook 9. Then, the further movement upwardly of the bar 171 results in the release of the chopper spring 211 and the actuation of the chopper 207 that severs the ticket that drops through the chute 206, all of which takes place before the mechanism returns to zero.

Then, the operator grasps the return-to-zero handle 129 and rotates its shaft 130, again storing up energy in the spring 211, feeding the paper strip to a new printing position and printing the advertising matter upon it. This also returns the indicator and the type wheels to zero.

If this is not done, and the operator attempts to again lift the hose from the hook 9 and repeat a cycle of operations, then the guard over the visual indicator wheels will drop and cover them to prevent him from finding out how much gas he is dispensing to the new customer.

This assumes that, in order to start the second illegal dispensing operation, he has pushed up hard enough on the hook 9 to cause the bar 171 to descend and break the hook 238, which would otherwise lock it. It will be understood that you cannot disengage 238 from 239, a shoulder on 171, until you have returned the mechanism back to zero. So this machine provides a triple protection against illegal dispensing of gasoline: the first is the hook 238, and the second is the shutter release mechanism. Additionally, the third safeguard is that, as the paper strip has not been refed for a new printing operation, because there has been no zero resetting, there would be no ticket issued to be printed upon and the second customer would not get a ticket which he would properly demand.

It will be understood that we desire to comprehend within our invention such modifications as come within the scope of the claims and the invention.

We claim:

1. In a gasoline dispensing apparatus, means responsive to the flow of gasoline dispensed for setting up printing wheels on printing mechanism operatively associated therewith, means to cause said printing mechanism to print initial and final readings on a strip, means for feeding said strip through said printing mechanism, a hose hook and means for feeding the paper strip to a position so as to receive the final printing operation comprising a reciprocating member, a rotary member actuated by said reciprocating member for actuating the paper strip feed, means for causing a final printing operation connected to be actuated by said hose hook whereby when said hose nozzle is placed on said hook said reciprocating member and rotary member are actuated to cause the feeding of said paper strip followed by the final printing operation thereof and zero resetting means adapted to again operate said strip feeding means and printing mechanism.

2. In a gasoline dispensing apparatus, means responsive to the flow of gasoline dispensed for setting up printing wheels on printing mechanism operatively associated therewith, means to cause said printing mechanism to print initial and final readings on a paper strip, means for feeding said strip through said printing mechanism, a hose hook and means for feeding the paper strip to a position so as to receive the final printing operation comprising a reciprocating member, a rotary member actuated by said reciprocating member for actuating the paper feed, means for causing a final printing operation connected to be actuated by said hose hook whereby when said hose nozzle is placed on said hook said reciprocating member and rotary member are actuated to cause the feeding of said paper strip followed by the final printing operation thereof, ratchet means connecting said reciprocating member and rotary member, and zero resetting means adapted to again operate said paper strip feeding means and printing mechanism.

3. In a gasoline dispensing apparatus, means responsive to the flow of gasoline dispensed for setting up printing wheels on printing mechanism operatively associated therewith, means to cause said printing mechanism to print initial and final readings on a paper strip, means for feeding said strip through said printing mechanism, a hose hook and means for feeding the paper strip to a position so as to receive the final printing operation comprising a reciprocating member, a rotary member actuated by said reciprocating member for actuating the paper feed, means for causing a final printing operation connected to be actuated by said hose hook whereby when said hose nozzle is placed on said hook said reciprocating member and rotary member are actuated to cause the feeding of said paper strip followed by the final printing operation thereof, and zero resetting means adapted to again operate said paper strip feeding means and printing mechanism, said first named means including means connected to said hose hook whereby when said hose nozzle is lifted off said hose hook the initial reading will be printed on said paper strip provided said zero re-setting means has been operated following a dispensing operation.

EARL E. EICKMEYER.
ANTHONY G. HORVATH.